(12) United States Patent
Younger

(10) Patent No.: US 6,340,160 B1
(45) Date of Patent: Jan. 22, 2002

(54) SYSTEM FOR SEALING RELATIVELY MOVABLE ELEMENTS

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 0 days.

(21) Appl. No.: 09/313,927

(22) Filed: May 18, 1999

Related U.S. Application Data

(63) Continuation-in-part of application No. 08/940,172, filed on Sep. 30, 1997, and a continuation-in-part of application No. 08/940,359, filed on Sep. 30, 1997.

(51) Int. Cl.$^7$ .............. F16J 9/00; F16J 9/06; F16J 15/54; F01C 19/10
(52) U.S. Cl. ............. 277/447; 277/357; 277/467; 277/482; 277/581
(58) Field of Search ............... 277/357, 434, 277/447, 448, 467, 482, 579, 589, 580, 581

(56) References Cited

U.S. PATENT DOCUMENTS

| | | | |
|---|---|---|---|
| 1,547,919 A | * 7/1925 | Huhn | 277/548 |
| 1,858,173 A | 5/1932 | Smittle | |
| 1,986,285 A | 1/1935 | Pollitz | |
| 3,023,014 A | 2/1962 | Donner | |
| 3,388,915 A | * 6/1968 | Dega | 277/448 |
| 3,394,941 A | * 7/1968 | Traub | |
| 3,494,624 A | 2/1970 | Woodling | |
| 3,525,530 A | 8/1970 | Bauer et al. | |
| 3,612,545 A | * 10/1971 | Storms | 277/448 |
| 3,656,764 A | * 4/1972 | Robinson | |
| 3,658,350 A | 4/1972 | Ondraka | |
| 3,711,104 A | 1/1973 | Henry | |
| 3,797,976 A | * 3/1974 | Moriya et al. | |
| 3,802,812 A | * 4/1974 | Ruf | |
| 3,887,198 A | 6/1975 | McClure et al. | |
| 3,909,015 A | * 9/1975 | Kasahara | |
| 4,087,099 A | * 5/1978 | Kurio | |
| 4,094,518 A | * 6/1978 | Cox | 277/390 |
| 4,132,417 A | 1/1979 | Lagerqvist | |
| 4,179,131 A | * 12/1979 | Nussbaumer | |
| 4,313,368 A | * 2/1982 | Promeyrat | 277/447 |
| 4,497,494 A | 2/1985 | Allen et al. | |
| 4,711,168 A | 12/1987 | Held | |
| 4,729,569 A | * 3/1988 | Miller | |
| 4,736,586 A | 4/1988 | Kawajiri | |
| 5,071,318 A | * 12/1991 | Bice et al. | 277/390 |
| 5,169,181 A | * 12/1992 | Timm et al. | |
| 5,230,285 A | * 7/1993 | Cogswell et al. | |
| 5,538,409 A | * 7/1996 | Cureton et al. | |
| 5,908,100 A | * 6/1999 | Szadkowski et al. | |

FOREIGN PATENT DOCUMENTS

| | | |
|---|---|---|
| CA | 585362 | 10/1959 |
| GB | 627805 | 7/1949 |
| GB | 1280712 | 7/1972 |
| GB | 6802 | 5/2000 |

OTHER PUBLICATIONS

Updating Actuator Piston Ring Seals of Teflon TFE; H.A. Traub; The Journal of Teflon, 8/65.
Fundamental Principles of Polymeric Materials; Rosen, John Wiley & Sons, 1971.

* cited by examiner

*Primary Examiner*—Anthony Knight
*Assistant Examiner*—Vishal Patel
(74) *Attorney, Agent, or Firm*—Mark P. Stone

(57) ABSTRACT

The present invention is directed to a system for providing a fluid seal between relatively movable elements, including a hub or a drum and a piston. A groove for retaining a seal is defined in the periphery of one of the rotatable elements, and a spacer element is disposed between the seal and the groove. The seal is formed from a substantially non-deformable material, and the spacer element is substantially non-resilient. The mass of the seal and the spacer element, together with rotational forces acting on the seal and the spacer element, provide a seal between the relatively rotatable elements for preventing flow of fluid.

10 Claims, 5 Drawing Sheets

SYSTEM FOR SEALING RELATIVELY MOVABLE ELEMENTS

This application is a continuation-in-part of Ser. Nos. 08/940,172 and 08/940,359, both filed Sep. 30, 1997.

BACKGROUND OF THE INVENTION

Sealing means for providing a fluid seal between relatively rotatable elements are generally known to the art. Applicant's prior U.S. patent application Ser. No. 07/305,416, filed Feb. 1, 1989 (now abandoned) entitled "System For Sealing Relatively Movable Elements" discloses a system for providing a fluid seal including a deformable seal, particularly a ring shaped seal element received in a groove of one of two relatively rotatable elements. A resilient element, as for example, a coil spring, is disposed in a groove defined in one relatively rotatable element, and urges the seal element in a direction towards the other relatively rotatable element to provide a fluid-tight seal between the first and second relatively rotatable elements.

The following references were cited in connection with Applicant's patent application: U.S. Pat. Nos. 1,858,173; 1,986,285; 3,023,014; 3,494,624; 3,525,530; 3,658,350; 3,711,104; 3,887,198; 4,132,417; 4,497,494; 4,711,168; 4,736,586; British Patent Nos. 1,280,712; 6,802; 627,085; French Patent No. 974,917; Canadian Patent No. 585,362; Netherlands Patent No. 24,905; Publication "Updating Actuator Piston Ring Seals of Teflon TFE", by H. A. Traub, The Journal of Teflon, August, 1965; and "Fundamental Principles of Polymeric Materials", by Stephen L. Rosen, published by John Wiley & Sons, 1971.

The aforementioned references disclose systems for providing fluid seals including systems employing either deformable seal elements, resilient supporting elements urging the seal element in a direction to maintain a fluid seal, or both. Sealing systems including deformable seal elements and/or resilient means urging the deformable seal elements into a sealing position, are disadvantageous in many respects. In particular, the use of a deformable seal element and/or resilient means engaging the deformable seal element, results in rapid wear of the seal requiring frequent replacement. Additionally, wear of the seal can result in a malfunction of the overall sealing system causing fluid to flow through the seal.

It is the primary object of the present invention to provide improved sealing means overcoming the disadvantages of the known sealing systems. In particular, the improvement of the present invention includes providing sealing means for relatively rotatable elements comprising a substantially non-deformable seal element used in conjunction with a substantially non-resilient spacer/supporting means. The improvement in accordance with the present invention enables the system to employ a thicker seal element than used in conventional sealing systems, reduces the rate of wear of the seal thereby reducing the frequency of replacement and reducing the likelihood of malfunction of the system, and permits fluid to enhance the integrity of the seal provided by the sealing element. Other advantages of the improved sealing system in accordance with the present invention will become apparent to those skilled in the art from the following discussion.

SUMMARY OF THE INVENTION

A system for sealing relatively rotatable elements, and in particular a drum with a hub and a piston, includes a groove defined in one of the rotatable elements adapted to receive a seal element therein. The groove element, which is arcuate in shape, is defined on the periphery of the piston or the hub carried by the drum, both of which are preferably circular in configuration. The seal received in the groove is preferably ring-shaped in configuration, and is formed from a substantially non-deformable material. The width of the seal is preferably less than the width of the groove, and the periphery of one surface of the seal extends beyond the outer surface of the groove.

A supporting or spacer element is received in the groove and is disposed between the groove and the seal element. The supporting or spacer element, which is also generally arcuate in configuration to conform to the shape of the groove and the seal element, is formed from a substantially non-resilient material.

In operation, when one of the rotatable elements rotates relative to the other, the seal element and the supporting (spacer) element maintain a fluid seal as a result of the mass of the two elements, and the rotational forces acting thereon. Because the supporting element is substantially non-resilient and does not urge the seal towards the opposed relatively rotatable element, wear on the seal element is reduced. Moreover, because no positive resilient force acts on the seal urging it towards the opposed relatively rotatable element, and because the seal itself is not formed from a deformable material, the seal element can be thicker than seal elements used in known systems and can be formed from a more rigid material. Accordingly, the integrity of the fluid seal is maintained when one of the relatively rotatable elements is rotated relative to the other, yet wear on the seal is reduced. Because the seal itself is formed from a substantially non-deformable material and is of a width less than the width of the groove, the seal element will not deform to occupy the space remaining in the groove between the seal element and the supporting (spacer) element during relative rotation of the elements. Accordingly, a recessed space will be defined in the groove adjacent to the seal element, and fluid received in this space will apply fluid pressure to the seal element and the supporting (spacer) element in the groove to enhance the integrity of the seal and to maintain the seal element and the supporting (spacer) element in its fixed operating position within the groove to enhance the efficiency of the sealing relationship during relative rotation of the two relatively rotatable elements.

DESCRIPTION OF THE BEST MODES FOR CARRYING OUT THE INVENTION

FIGS. 1–8 illustrate improved sealing systems for relatively rotatable elements, in accordance with the present invention. In particular, the invention is directed to sealing means disposed between a relatively rotatable drum including a central hub portion, and a piston having a central opening adapted to receive the hub of the drum therein in relatively rotatable relationship. The sealing system disclosed herein is particularly useful in connection with automotive applications including piston seals.

Figure 1:
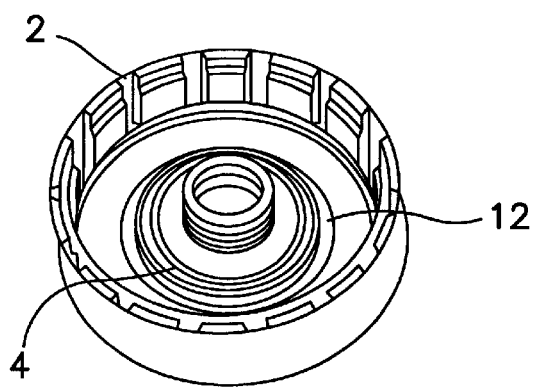
FIG. 1 illustrates a perspective view of a drum, including a central hub, of the type employed in connection with the present invention.
Figure 2:
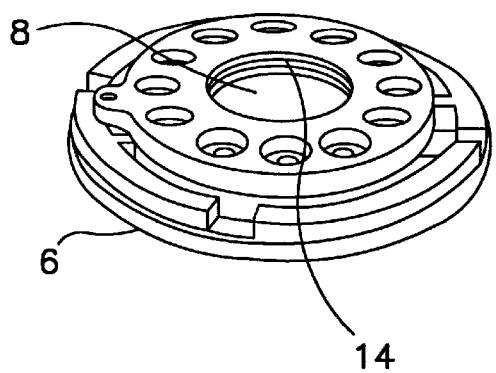
FIG. 2 illustrates, in perspective, a piston having a central opening adapted to be mounted over the hub of the drum illustrated by FIG. 1 in relative rotatable relationship therewith, in accordance with the present invention.
Figure 3:
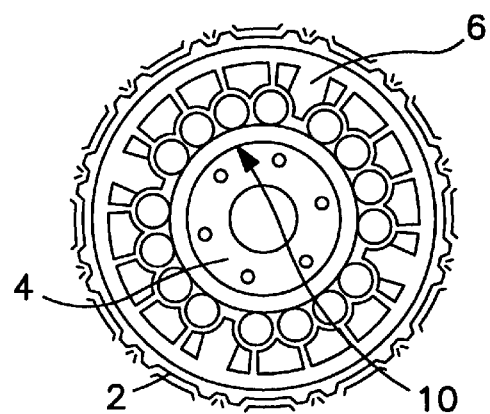
FIG. 3 schematically illustrates the piston shown in FIG. 2 mounted to the drum shown in FIG. 1 for relative rotatable movement in accordance with the present invention.

Referring first to FIGS. 1–3, a drum generally designated by reference numeral 2 defines an integral upwardly extending, centrally disposed hub portion 4. A piston generally designated by reference numeral 6 defines a centrally disposed opening 8 which generally corresponds to the configuration and dimensions of the hub 4 of the drum 2. In this manner, the piston 6 can be mounted in the drum 2 such that the hub 4 is received in the opening 8, and the outer diameter of the hub is substantially equal to the inner diameter of the opening 8. FIG. 3 illustrates the piston 6 mounted to the drum 2 such that the hub 4 is aligned with and received within the opening 8 defined in the center of the piston. A seal 10, which is ring shaped, is disposed between the outer diameter of the hub and the periphery of the opening in the piston to provide a sealing relationship between the piston and the hub when the piston is mounted to the drum. The sealing relationship between the piston and the drum is maintained during relative rotation between the drum and the hub (e.g., in typical automotive applications, the drum is rotatable relative to the piston at speeds ranging between 2000–6000 rotations per minute).

In order to retain the seal element 10 disposed in sealing relationship between the piston and the hub as illustrated in FIG. 3, the seal can be retained in a groove 12 defined in the outer periphery of the hub (See FIG. 1), which results in an "out-facing" seal. In the alternative, the seal 10 can be retained in a groove 14 defined in the piston 6 along the outer periphery of the opening 8 (See FIG. 2), which results in an "in-facing" seal.

Systems currently used for sealing pistons mounted to rotatable drums are generally formed from soft or deformable material. The deformable nature of such sealing rings is disadvantageous in many respects—soft deformable seals are subject to rapid wear resulting in the need to replace the seals frequently to avoid malfunction of the overall sealing system; deformable seals tend to become re-sized and re-shaped thereby decreasing the effectiveness of the seal as a result of the application of rotational forces to the seal as the drum and piston rotate relative to each other at rotational speeds ranging between 2000–6000 rotations per minute; and seals formed from deformable material, as a result of heat and pressure applied thereto during normal operation, tend to re-reform in configurations different from the original shape of the seal after relative rotation of the hub and piston ceases, thereby adversely affecting the integrity and performance of the seal in subsequent operations. Although other known sealing systems suggest forming a seal ring from a less deformable material such as TEFLON, these known systems advocate the application of a resilient force to the seal element, thereby disadvantageously accelerating the wear on the seal and increasing the frequency of seal replacement necessary to avoid malfunction of the sealing system.

Figure 4:
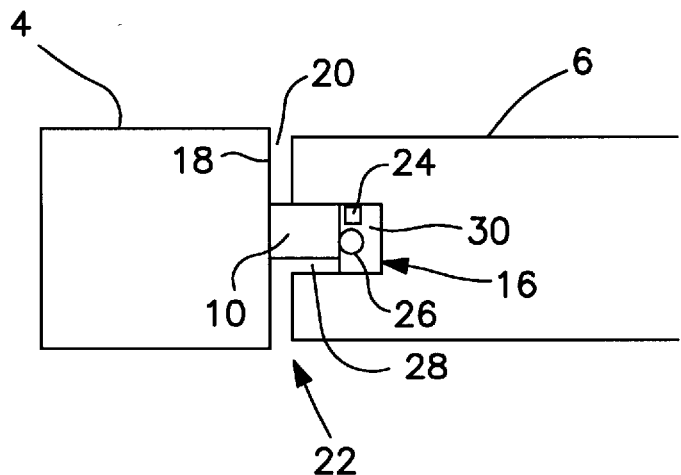
FIG. 4 schematically illustrates an "in-facing" seal between the piston and the hub in accordance with one embodiment of the present invention.

FIG. 4 schematically illustrates an "in-facing" seal in accordance with the present invention, as generally discussed above. The hub 4 of the drum (e.g., drum 2 illustrated in FIG. 1 but not shown in FIG. 4) extends through a central opening (e.g. opening 8 shown in FIG. 2) of the piston 6. The piston is mounted on the drum and over the hub as illustrated in FIG. 3. A sealing ring 10 is received in a peripheral groove 16 defined in the piston and facing towards the outer surface 18 of the hub 4. The seal 10 seals a gap 20 defined between the piston and the hub to prevent fluid, as represented by arrow 22, from flowing completely through the gap 20. A spacer or supporting element 24 having a generally square cross-sectional configuration, or in the alternative a spacer or supporting element 26 having a round cross-sectional configuration, is disposed in the groove 16 between the piston and the seal ring 10.

In accordance with one aspect of the present invention, the seal 10 is formed from a substantially non-deformable material, (such as Teflon/Viton/Nylon/PVC or polyurethane). The spacer element disposed around the outer surface of the seal ring 10 is formed from a substantially non-resilient material, as for example, a non-resilient metallic wire.

In operation of the sealing system as illustrated by FIGS. 1–4, the drum 2 and thus the hub 4 rotates relative to the piston 6, and the seal ring 10 is propelled in a direction outward from the hub towards the back surface of the groove 16 defined in the piston 6 as a result of rotational forces. The mass of the non-deformable seal 10, together with the mass of the non-resilient spacer element (24, 26), counteracts the centrifugal force applied to the seal to reduce wear on the seal ring. Wear is further reduced because the seal element 10 is formed from a harder, substantially non-deformable material. The dimensions of the seal element 10 and the spacer (24, 26) mounted around the outer periphery of the seal 10 are selected such that even during maximum displacement of the seal outwardly from the hub as a result of centrifugal forces applied to the seal when the drum rotates relative to the piston, the seal 10 will nonetheless block the gap 20 defined between the hub and the piston to prevent flow of fluid 22 therethrough.

In accordance with the present invention, wear on the seal element 10 is further reduced by forming the spacer or supporting element (24, 26) from a substantially non-resilient material. In this manner, no excessive resilient force is exerted on the seal element in a direction towards the rotating hub which would increase wear on the seal element, yet the mass of the spacer or supporting element cooperates with the mass of the substantially non-deformable seal 10, to counteract the centrifugal force applied to the seal by the rotating hub to reduce wear on the seal ring 10.

Because the seal 10 is formed from a substantially non-deformable material, it will not deform in a downward direction, as seen in FIG. 4, in the groove 16 as a result of applied rotational forces and heat generated by frictional forces when the hub rotates relative to the piston. Therefore, as a result of the non-deformable nature of the seal 10, a gap or space 28 will remain defined between the lower surface of the seal 10 and the lower surface of the groove 16 when the hub rotates relative to the piston. In this manner, fluid 22 will fill the space 28 to apply fluid pressure to the non-deformable seal 10 to maintain it in its proper sealing position in the groove 16 and relative to the hub 4 to further enhance the integrity of the seal provided thereby. Fluid 22 will also enter into any open space 30 defined between the outer surface of the seal 10 and the rear surface of the groove 16 in the piston 6 to apply a fluid pressure on the seal in the direction of the rotating hub 4 to further enhance the integrity of the sealing effect provided by the ring seal 10.

Figure 5:
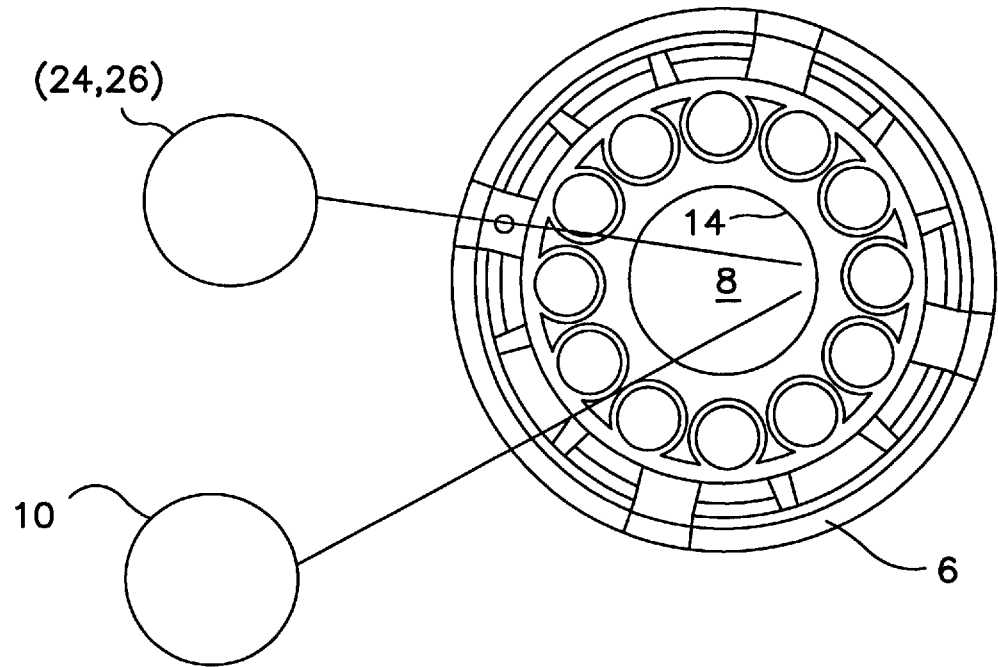
FIG. 5 schematically illustrates the procedure by which the "in-facing" seal element shown in FIG. 4 is installed in the piston, in accordance with the present invention.

FIG. 5 illustrates the procedure by which the ring seal 10 and the spacer or retainer ring (24, 26) is mounted to the piston 6. First the spacer element is mounted in the groove 14 defined along the outer periphery of the opening 8 in the center of the piston 6. Then, the ring seal 10 is mounted in the groove over the spacer ring (24, 26) such that the spacer ring is disposed between the outer surface of the ring seal and the rear surface of the groove 14. Because the ring seal 10 is formed from a substantially non-deformable material, the inside diameter of the ring seal can be larger than the outer diameter of the hub 4 of the drum 2 to avoid pinching between the seal and the hub which is a common problem when deformable or resilient seals are employed. In this manner, the piston can be quickly mounted to the hub and any pinching damage to the seal ring is avoided.

The formation of the ring seal 10 from a substantially non-deformable material advantageously permits a thicker seal to be used since it is not necessary to consider and compensate for expansion or deformation of the seal in the groove 16. As discussed herein, the sealing effect is provided primarily as a result of the substantially non-deformable characteristic of the seal element, the substantially non-resilient characteristic of the supporting/retaining spacer element cooperating with the seal element, and the operative relationship between the seal, the spacer element, centrifugal forces applied by the rotation of the drum relative to the piston, and fluid pressure applied to the seal during rotation of the drum relative to the piston.

Figure 6:
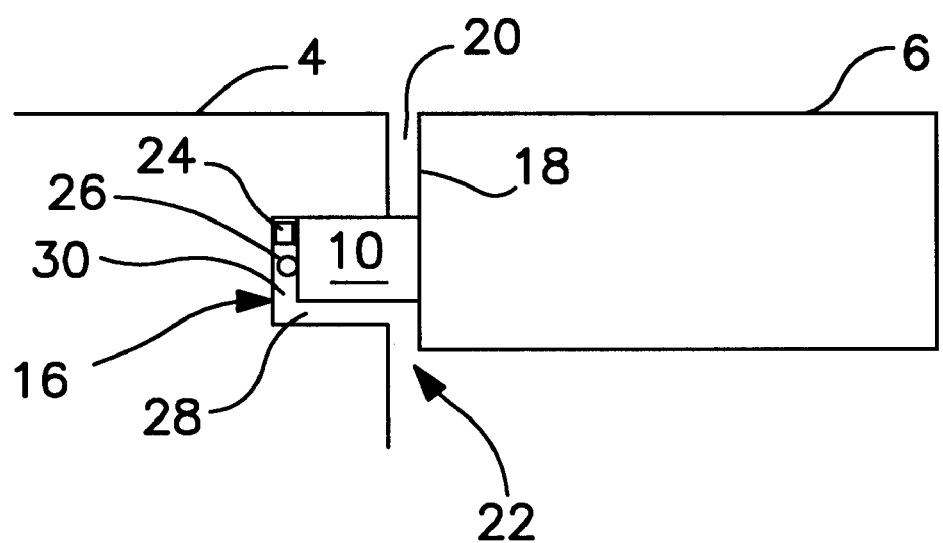
FIG. 6 schematically illustrates an "out-facing" sealing system in accordance with another embodiment of the present invention.

FIG. 6 schematically illustrates an "out-facing" seal in accordance with the present invention, as generally discussed above. (Elements common to those illustrated in FIGS. 1–5 have been designated with the same reference numerals). The hub 4 of the drum (e.g., drum 2 illustrated in FIG. 1 but not shown in FIG. 6) extends through a central opening (e.g. opening 8 shown in FIG. 2) of the piston 6. The piston is mounted on the drum and over the hub as illustrated in FIG. 3. A sealing ring 10 is received in a peripheral groove 16 defined in the outer surface of the hub 4 and facing towards the inner surface 18 of the piston 6. The seal 10 seals a gap 20 defined between the piston and the hub to prevent fluid, as represented by arrow 22, from flowing completely through the gap 20. A spacer or supporting element 24 having a generally square cross-sectional configuration, or in the alternative a spacer or supporting element 26 having a round cross-sectional configuration, is disposed in the groove 16 between the piston and the seal ring 10.

In accordance with one aspect of the present invention, the seal 10 is formed from a substantially non-deformable material, (such as Teflon/Viton/Nylon/PVC or polyurethane). The spacer element disposed around the inner surface of the seal ring 10 is formed from a substantially non-resilient material, as for example, a non-resilient metallic wire.

In operation of the sealing system as illustrated by FIGS. 1–3 and 6, the drum 2 and thus the hub 4 rotates relative to the piston 6, and the seal ring 10 is propelled in a direction outward from the hub towards the back surface of the groove 16 defined in the piston 6. The mass of the non-deformable seal 10, together with the mass of the non-resilient spacer element (24, 26), are driven outwardly towards the inner surface 18 of the piston by rotational forces applied thereto to assure a firm sealing engagement between the outer surface of the seal element 10 and the inner surface 18 of the piston. Wear is reduced because the seal element 10 is formed from a harder, substantially non-deformable material. The dimensions of the seal element 10 and the spacer element (24, 26) mounted around the inner periphery of the seal 10 are selected such that even during maximum displacement of the seal outwardly from the hub as a result of centrifugal forces applied to the seal when the drum rotates relative to the piston, the seal 10 will nonetheless block the gap 20 defined between the hub and the piston to prevent flow of fluid 22 therethrough.

In accordance with the present invention, wear on the seal element 10 is further reduced by forming the spacer or supporting element (24, 26) from a substantially non-resilient material. In this manner, no excessive resilient force is exerted on the seal element (which is rotatable with the hub) in a direction towards the piston hub which would increase wear on the seal element, yet the mass of the spacer or supporting element cooperates with the mass of the substantially non-deformable seal 10 and the rotational forces applied thereon, to assure a firm sealing engagement between the outer surface of the seal element and the inner surface of the piston.

Because the seal 10 is formed from a substantially non-deformable material, it will not deform in a downward direction, as seen in FIG. 6, in the groove 16 as a result of applied rotational forces and heat generated by frictional forces when the hub rotates relative to the piston. Therefore, as a result of the non-deformable nature of the seal 10, a gap or space 28 will remain defined between the lower surface of the seal 10 and the lower surface of the groove 16 when the hub rotates relative to the piston. In this manner, fluid 22 will fill the space 28 to apply fluid pressure to the non-deformable seal 10 to maintain it in its proper sealing position in the groove 16 and relative to the hub 4 to further enhance the integrity of the seal provided thereby. Fluid 22 will also enter into any open space 30 defined between the inner surface of the seal 10 and the rear surface of the groove 16 in the hub 4 to apply a fluid pressure on the seal in the direction of the inner surface of the piston to further enhance the integrity of the sealing effect provided by the ring seal 10.

The formation of the ring seal 10 from a substantially non-deformable material advantageously permits a thicker seal to be used since it is not necessary to consider and compensate for expansion or deformation of the seal in the groove 16. As discussed herein, the sealing effect is provided primarily as a result of the substantially non-deformable characteristic of the seal element, the substantially non-resilient characteristic of the supporting/retaining spacer element cooperating with the seal element, and the operative relationship between the seal, the spacer element, centrifugal forces applied by the rotation of the drum relative to the piston, and fluid pressure applied to the seal during rotation of the drum relative to the piston.

The sealing system provided by the present invention eliminates disadvantages of known sealing systems which employ deformable seal elements (which are subject to deformation and re-formation as a result of rotational forces and heat applied thereto during operation), and excessively quick wear resulting from the deformable nature of the seal and/or resilient forces applied to the seal which tend to accelerate wear during operation of the sealing system. The present invention advantageously reduces or eliminates the disadvantages of the known sealing systems by employing a substantially non-deformable seal operatively cooperating with a substantially non-resilient spacer element, as discussed herein. Although the discussion of the sealing system herein is directed to a drum rotatable relative to a piston, the system is equally applicable to a piston rotatable relative to a drum.

Figure 7:
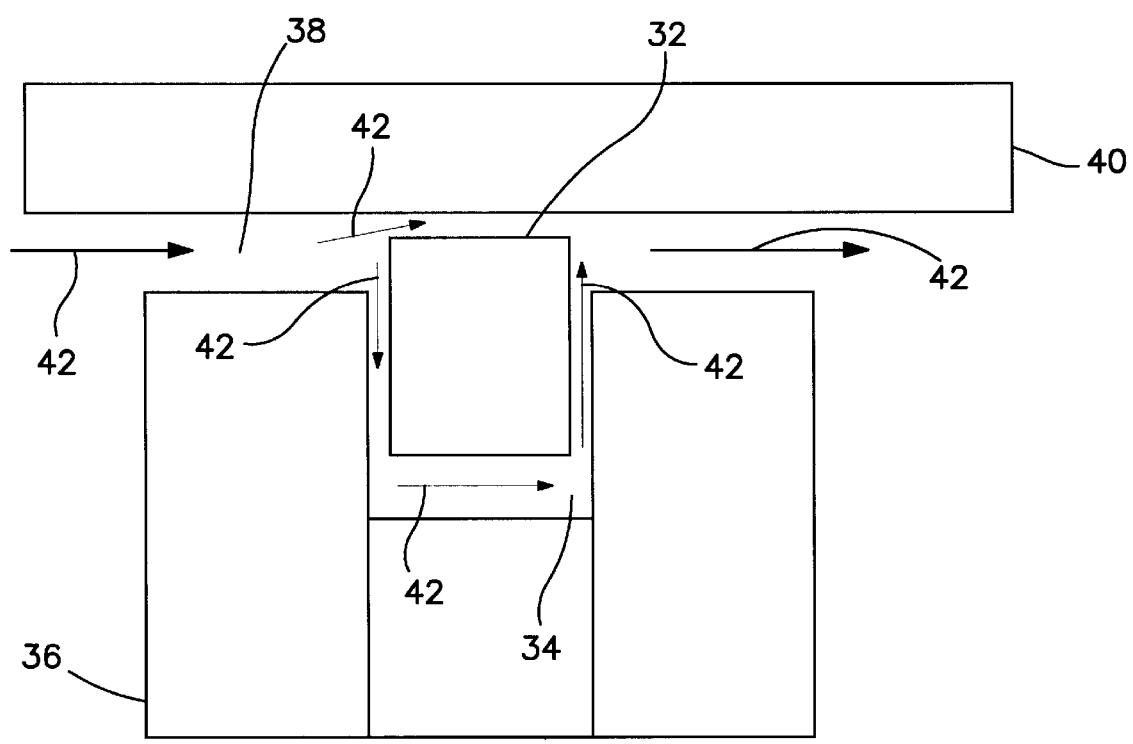
FIG. 7 schematically illustrates a prior art sealing system.
Figure 8:
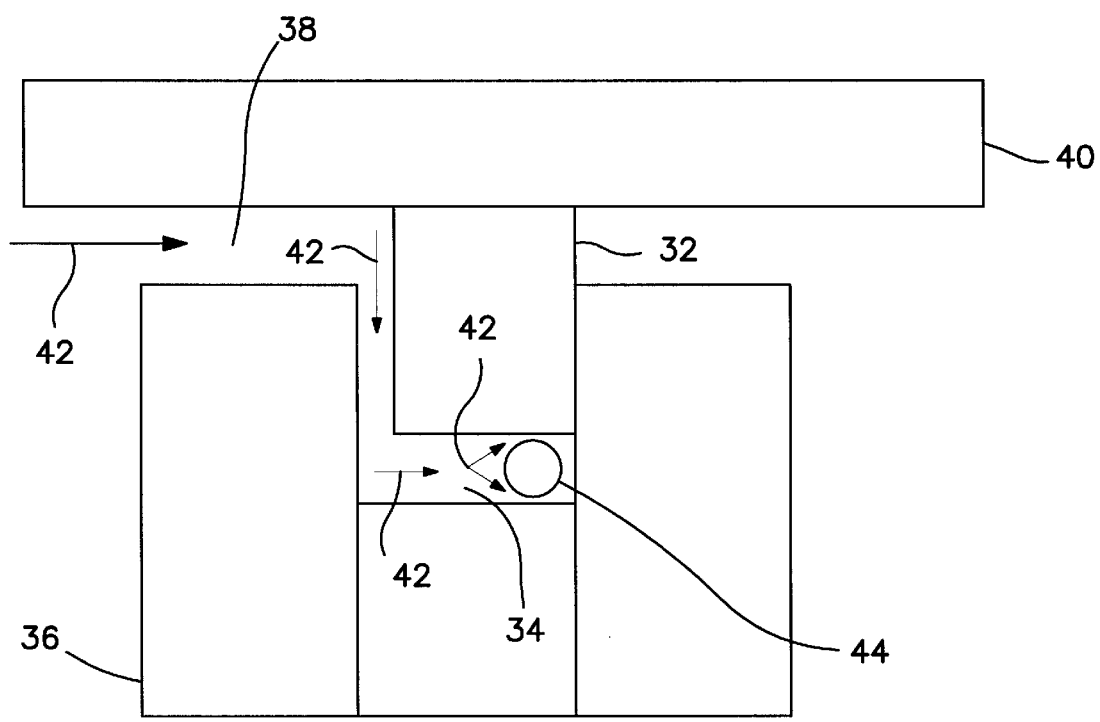
FIG. 8 schematically illustrates a modification of the system illustrated by FIG. 7 in accordance with the present invention.

FIGS. 7–8 of the drawing illustrate a further embodiment of a sealing system in accordance with the present invention. A sealing ring designated by reference numeral 32 is preferably formed from a non-deformable material, such as a plastic ring. A plastic ring has no inherent outward tension, and tends to become reduced in size during use as a result of time, temperature and pressure. The sealing element (ring) 32 illustrated by FIG. 7 is partially received in a recess 34 defined in a first relatively rotatable element which is designated as a shaft 36. The sealing element 32 extends into a space 38 defined between the shaft 36 and a second relatively rotatable element, such as a bore, designated by reference numeral 40. Fluid flow (shown from left to right in FIG. 7 of the drawing) through the space 38 and around the sealing element 32 is generally illustrated by the arrows designated by reference numeral 42. As is apparent from FIG. 7, when no positive pressure is exerted on the sealing element 32, it assumes a "neutral" position relative to the shaft 36 and the bore 40 in which fluid flows around all sides of the sealing element. The sealing element fails to move upwardly to seal the lower surface of element 40 by obstructing fluid flow through the passageway 38 and around the sealing element.

FIG. 8 illustrates the sealing system of FIG. 7 in which a spacer element 44 is disposed beneath the lower surface of the seal element 32. The spacer element can be formed from a metal or plastic material, and preferably is round in cross section so as to be freely movable in the portion of space 34 defined beneath the lower surface of the seal element 32 as a result of changes in fluid pressure in that space. However, it is also within the scope of the present invention to provide a spacer element 44 which is fixedly positioned in the location illustrated by FIG. 8.

Still referring to FIG. 8 of the drawing, fluid flow into the passageway 38 in a direction from left to right as indicated by arrows 42, causes the spacer element 44 to move into the position in which it is illustrated in FIG. 8. The dynamics of the inflowing fluid 42 simultaneously exerts an upward pressure or force against the lower surface of the seal element 32. the spacer element in the position illustrated in FIG. 8 and the fluid pressure directed upwardly against the lower surface of the seal element 32 cooperate to move the sealing element 32 into the position illustrated in FIG. 8 in which fluid flow through the passageways 38 and 34 is completely blocked by the seal 32 so that the flow of fluid 42 is completely obstructed by the seal element 32. When fluid flows in the opposite direction (from right to left in FIG. 8), the reverse procedure occurs, and the seal element 32 and the spacer element 44, as a result of the applied fluid pressure, are moved into their left-most positions, thereby completely blocking flow of fluid through the space 38 and around the seal element 32 in a direction from right to left.

Although FIGS. 7–8 illustrate a sealing system used in conjunction with an outwardly facing seal element, this has been done for illustrative purposes only. The sealing system illustrated by FIGS. 7–8 is equally applicable to a system having an inwardly facing seal element.

Modifications and applications of the sealing system disclosed herein within the scope of the present invention will become apparent to those skilled in the art. Accordingly, the description of the preferred embodiments of the invention are intended to be illustrative only, and not restrictive of the scope of the invention, that scope being defined by the following claims and all equivalents thereto.

What is claimed is:

1. A system for providing a seal for preventing fluid flow between relatively rotatable elements, said system comprising:

first and second relatively rotatable elements;

said first element having a groove defined therein for receiving a seal element and retaining said seal element at a predetermined orientation relative to said second element;

a seal element removably received in said groove; and a spacer element disposed between said seal element in said groove and said first element, said spacer element being formed from a substantially non-resilient material;

wherein said first element is a piston having an opening therein, said groove being defined around a periphery of said opening in said piston;

wherein said second element is a drum having a hub, said hub of said drum adapted to be received in said opening in said piston;

said piston and said drum being arranged such that said seal element extends inwardly from said opening in said piston and is contiguous with an outer surface of said hub of said drum when said hub is received in said opening in said piston.

2. The system as claimed in claim 1 wherein said spacer element is formed from a wire.

3. The system as claimed in claim 2 wherein said wire is metallic.

4. The system as claimed in claim 1 wherein said drum is rotatable relative to said piston.

5. The system as claimed in claim 1 wherein said piston is rotatable relative to said drum.

6. The system as claimed in claim 1 wherein said seal element is formed from a substantially non-deformable material.

7. A system for providing a seal for preventing fluid flow between relatively rotatable elements, said system comprising:

first and second relatively rotatable elements;

said first element having a groove defined therein for receiving a seal element and retaining said seal element in a predetermined orientation relative to said second element;

a seal element removably received in said groove; and a spacer element disposed between said seal element in said groove and said first element, said spacer element being formed from a substantially non-resilient material;

wherein said first element is a drum having a hub thereon, said groove being defined around an outer surface of the hub;

wherein said second element is a piston having an opening therein, said hub of said drum adapted to be received in said opening in said piston;

said piston and said drum being arranged such that said seal element extends outwardly from said outer surface of said hub and is contiguous with a periphery of said opening in said piston when said hub is received in said opening in said piston.

8. The system as claimed in claim 7 wherein said drum is rotatable relative to said piston.

9. The system as claimed in claim 7 wherein said piston is rotatable relative to said drum.

10. The system as claimed in claim 7 wherein said seal element is formed from a substantially non-deformable material.

* * * * *